United States Patent
Keith, Jr.

(10) Patent No.: US 9,645,900 B2
(45) Date of Patent: *May 9, 2017

(54) WARM STANDBY APPLIANCE

(71) Applicant: Microsoft Technology Licensing, LLC, Redmond, WA (US)

(72) Inventor: Robert O. Keith, Jr., Modesto, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/279,199

(22) Filed: May 15, 2014

(65) Prior Publication Data

US 2014/0331080 A1 Nov. 6, 2014

Related U.S. Application Data

(63) Continuation of application No. 12/940,526, filed on Nov. 5, 2010, now Pat. No. 8,745,171, which is a (Continued)

(51) Int. Cl.
*G06F 15/16* (2006.01)
*G06F 11/20* (2006.01)
(Continued)

(52) U.S. Cl.
CPC ...... *G06F 11/2028* (2013.01); *G06F 11/1464* (2013.01); *G06F 11/1662* (2013.01);
(Continued)

(58) Field of Classification Search
CPC ............ G06F 11/2038; G06F 11/2041; G06F 11/1662; H04L 67/2842
(Continued)

(56) References Cited

U.S. PATENT DOCUMENTS 4,866,635 A 9/1989 Kahn et al.
5,204,897 A 4/1993 Wyman
(Continued)

FOREIGN PATENT DOCUMENTS

WO 2005119493 A2 12/2005
WO 2005119494 A2 12/2005
(Continued)

OTHER PUBLICATIONS

IBM Corporation, AFS: "User Guide", First Edition, Version 3.6. Apr. 2000, pp. 112.
(Continued)

*Primary Examiner* — James Conaway
(74) *Attorney, Agent, or Firm* — Workman Nydegger (57) ABSTRACT

A warm standby appliance is described herein. The warm standby appliance is coupled to a storage server which is coupled to one or more servers. When a server fails, the storage server transfers a backed up image to the warm standby appliance, so that the warm standby appliance is able to replicate the failed server. While the failed server is inaccessible, the warm standby appliance is able to mimic the functionality of the failed server. When a new server or repaired server is available, the warm standby appliance is no longer needed. To incorporate the new server into the system quickly and easily, the server image of the warm standby appliance is sent to the new server. After transferring the image, the warm standby appliance is cleaned and returns back to a dormant state, waiting to be utilized again.

28 Claims, 6 Drawing Sheets

Related U.S. Application Data continuation of application No. 11/644,581, filed on Dec. 21, 2006, now Pat. No. 7,844,686.

(51) Int. Cl.
*H04L 29/08* (2006.01)
*G06F 11/16* (2006.01)
*G06F 11/14* (2006.01)

(52) U.S. Cl.
CPC ...... *G06F 11/2038* (2013.01); *H04L 67/2847* (2013.01); *G06F 11/1484* (2013.01); *G06F 11/2023* (2013.01)

(58) Field of Classification Search
USPC ................. 709/219; 707/204, 619; 714/4–16
See application file for complete search history.

(56) References Cited

U.S. PATENT DOCUMENTS

| | | |
|---|---|---|
| 5,602,990 A | 2/1997 | Leete |
| 5,649,196 A | 7/1997 | Woodhill et al. |
| 5,659,743 A | 8/1997 | Adams et al. |
| 5,787,409 A | 7/1998 | Seiffert et al. |
| 5,802,364 A | 9/1998 | Senator et al. |
| 5,812,751 A | 9/1998 | Ekrot et al. |
| 5,835,911 A | 11/1998 | Nakagawa et al. |
| 5,897,635 A | 4/1999 | Torres et al. |
| 5,930,357 A | 7/1999 | Fukui |
| 5,933,647 A | 8/1999 | Aronberg et al. |
| 5,950,010 A | 9/1999 | Hesse et al. |
| 5,974,547 A | 10/1999 | Kilemenko |
| 6,012,152 A | 1/2000 | Douik et al. |
| 6,029,196 A | 2/2000 | Lenz |
| 6,067,582 A | 5/2000 | Smith et al. |
| 6,144,959 A | 11/2000 | Anderson et al. |
| 6,170,065 B1 | 1/2001 | Kobata et al. |
| 6,189,101 B1 | 2/2001 | Dusenbur, Jr. |
| 6,209,089 B1 | 3/2001 | Selitrennikoff et al. |
| 6,212,660 B1 | 4/2001 | Joeressen et al. |
| 6,282,711 B1 | 8/2001 | Halpern et al. |
| 6,292,827 B1 | 9/2001 | Raz et al. |
| 6,301,612 B1 | 10/2001 | Selitrennikoff et al. |
| 6,311,221 B1 | 10/2001 | Raz et al. |
| 6,314,428 B1 | 11/2001 | Brew et al. |
| 6,317,761 B1 | 11/2001 | Landsman et al. |
| 6,339,826 B2 | 1/2002 | Hayes, Jr. et al. |
| 6,349,137 B1 | 2/2002 | Hunt et al. |
| 6,356,915 B1 | 3/2002 | Chtchetkine et al. |
| 6,363,400 B1 | 3/2002 | Chtchetkine et al. |
| 6,366,296 B1 | 4/2002 | Boreczky et al. |
| 6,378,035 B1 | 4/2002 | Parry et al. |
| 6,421,777 B1 | 7/2002 | Pierre-Louis et al. |
| 6,449,658 B1 | 9/2002 | Lafe et al. |
| 6,459,499 B1 | 10/2002 | Tomat |
| 6,463,530 B1 | 10/2002 | Sposato |
| 6,473,794 B1 | 10/2002 | Guheen et al. |
| 6,477,531 B1 | 11/2002 | Sullivan et al. |
| 6,490,677 B1 | 12/2002 | Aguilar et al. |
| 6,536,037 B1 | 3/2003 | Guheen et al. |
| 6,553,375 B1 | 4/2003 | Huang et al. |
| 6,556,950 B1 | 4/2003 | Schwenke et al. |
| 6,574,618 B2 | 6/2003 | Eylon et al. |
| 6,578,142 B1 | 6/2003 | Anderson et al. |
| 6,606,744 B1 | 8/2003 | Mikurak |
| 6,625,651 B1 | 9/2003 | Swartz et al. |
| 6,625,754 B1 | 9/2003 | Aguilar et al. |
| 6,633,782 B1 | 10/2003 | Schleiss et al. |
| 6,636,857 B2 | 10/2003 | Thomas et al. |
| 6,654,797 B1 | 11/2003 | Kamper |
| 6,654,801 B2 | 11/2003 | Mann et al. |
| 6,694,375 B1 | 2/2004 | Beddus et al. |
| 6,697,852 B1 | 2/2004 | Ryu |
| 6,704,886 B1 | 3/2004 | Gill et al. |
| 6,718,464 B2 | 4/2004 | Cromer et al. |
| 6,728,530 B1 | 4/2004 | Heinonen et al. |
| 6,735,625 B1 | 5/2004 | Ponna |
| 6,751,658 B1 | 6/2004 | Haun et al. |
| 6,757,729 B1 | 6/2004 | Devarakonda et al. |
| 6,757,894 B2 | 6/2004 | Eylon et al. |
| 6,795,912 B1 | 9/2004 | Itoh et al. |
| 6,816,462 B1 | 11/2004 | Booth, III et al. |
| 6,816,882 B1 | 11/2004 | Conner et al. |
| 6,820,180 B2 | 11/2004 | McBrearty et al. |
| 6,854,009 B1 | 2/2005 | Hughes |
| 6,871,210 B1 | 3/2005 | Subramanian |
| 6,880,108 B1 | 4/2005 | Gusler et al. |
| 6,885,481 B1 | 4/2005 | Dawe |
| 6,886,020 B1 | 4/2005 | Zahavi |
| 6,898,286 B2 | 5/2005 | Murray |
| 6,915,343 B1 | 7/2005 | Brewer et al. |
| 6,954,853 B2 | 10/2005 | Wang et al. |
| 6,954,930 B2 | 10/2005 | Drake et al. |
| 6,959,235 B1 | 10/2005 | Abdel-Malek et al. |
| 6,985,967 B1 | 1/2006 | Hipp |
| 7,003,560 B1 | 2/2006 | Mullen |
| 7,003,663 B2 | 2/2006 | Lagosanto et al. |
| 7,024,471 B2 | 4/2006 | George et al. |
| 7,058,698 B2 | 6/2006 | Chatterjee et al. |
| 7,080,118 B2 | 7/2006 | Hildebrand |
| 7,143,307 B1 | 11/2006 | Witte et al. |
| 7,149,698 B2 | 12/2006 | Guheen et al. |
| 7,165,087 B1 | 1/2007 | Graupner et al. |
| 7,175,078 B2 | 2/2007 | Ban et al. |
| 7,178,166 B1 | 2/2007 | Taylor et al. |
| 7,194,445 B2 | 3/2007 | Chan et al. |
| 7,200,779 B1 | 4/2007 | Coss, Jr. et al. |
| 7,210,143 B2 | 4/2007 | Or et al. |
| 7,237,122 B2 | 6/2007 | Kadam et al. |
| 7,260,597 B1 | 8/2007 | Hofrichter et al. |
| 7,287,053 B2 | 10/2007 | Bodin |
| 7,305,671 B2 | 12/2007 | Davidov et al. |
| 7,328,367 B2 | 2/2008 | Ukai et al. |
| 7,330,997 B1 | 2/2008 | Odom |
| 7,337,311 B2 | 2/2008 | Chen et al. |
| 7,392,046 B2 | 6/2008 | Leib et al. |
| 7,401,125 B1 | 7/2008 | Uchida et al. |
| 7,480,822 B1 | 1/2009 | Arbon et al. |
| 7,487,383 B2 | 2/2009 | Bensinger |
| 7,512,584 B2 | 3/2009 | Keith, Jr. |
| 7,571,467 B1 | 8/2009 | Priestley et al. |
| 7,577,431 B2 | 8/2009 | Jiang |
| 7,624,086 B2 | 11/2009 | Keith, Jr. |
| 7,627,694 B2 | 12/2009 | Sreenivasan et al. |
| 7,664,834 B2 | 2/2010 | Keith, Jr. |
| 7,698,487 B2 | 4/2010 | Rothman et al. |
| 7,703,142 B1 | 4/2010 | Wilson et al. |
| 7,752,486 B2 | 7/2010 | Satran et al. |
| 7,788,524 B2 | 8/2010 | Wing et al. |
| 7,840,514 B2 | 11/2010 | Keith, Jr. |
| 7,844,686 B1 | 11/2010 | Keith, Jr. |
| 7,886,031 B1 | 2/2011 | Taylor et al. |
| 7,908,339 B2 | 3/2011 | Keith, Jr. |
| 7,912,902 B2 | 3/2011 | Cheng et al. |
| 8,099,378 B2 | 1/2012 | Keith, Jr. |
| 8,126,722 B2 | 2/2012 | Robb et al. |
| 8,175,418 B1 | 5/2012 | Keith, Jr. |
| 8,234,238 B2 | 7/2012 | Keith, Jr. |
| 8,244,864 B1 | 8/2012 | Bahl et al. |
| 8,307,239 B1 | 11/2012 | Keith, Jr. |
| 8,423,821 B1 | 4/2013 | Keith, Jr. |
| 8,612,741 B2 | 12/2013 | Crisan et al. |
| 2001/0034736 A1 | 10/2001 | Eylon et al. |
| 2001/0037323 A1 | 11/2001 | Moulton et al. |
| 2001/0037399 A1 | 11/2001 | Eylon et al. |
| 2001/0037400 A1 | 11/2001 | Raz et al. |
| 2001/0044850 A1 | 11/2001 | Raz et al. |
| 2001/0049793 A1 | 12/2001 | Sugimoto |
| 2002/0007418 A1 | 1/2002 | Hegde et al. |
| 2002/0013827 A1 | 1/2002 | Edstrom et al. |
| 2002/0035674 A1 | 3/2002 | Vetrivelkumaran et al. |
| 2002/0042833 A1 | 4/2002 | Hendler et al. |
| 2002/0049764 A1 | 4/2002 | Boothby et al. |
| 2002/0059505 A1 | 5/2002 | St. Pierre et al. |

(56) References Cited

U.S. PATENT DOCUMENTS

| | | |
|---|---|---|
| 2002/0083183 A1 | 6/2002 | Pujare et al. |
| 2002/0087625 A1 | 7/2002 | Toll et al. |
| 2002/0087717 A1 | 7/2002 | Atzi et al. |
| 2002/0087883 A1 | 7/2002 | Wohlgemuth et al. |
| 2002/0087963 A1 | 7/2002 | Eylon et al. |
| 2002/0091763 A1 | 7/2002 | Shah et al. |
| 2002/0094868 A1 | 7/2002 | Tuck et al. |
| 2002/0099934 A1 | 7/2002 | Cromer et al. |
| 2002/0104080 A1 | 8/2002 | Woodard et al. |
| 2002/0107920 A1 | 8/2002 | Hotti |
| 2002/0107945 A1 | 8/2002 | George et al. |
| 2002/0116585 A1 | 8/2002 | Scherr |
| 2002/0124092 A1 | 9/2002 | Urien |
| 2002/0129089 A1 | 9/2002 | Hegde et al. |
| 2002/0131404 A1 | 9/2002 | Mehta et al. |
| 2002/0138640 A1 | 9/2002 | Raz et al. |
| 2002/0157089 A1 | 10/2002 | Patel et al. |
| 2002/0161868 A1 | 10/2002 | Paul et al. |
| 2002/0161908 A1 | 10/2002 | Benitez et al. |
| 2002/0169797 A1 | 11/2002 | Hegde et al. |
| 2002/0188941 A1 | 12/2002 | Cicciarelli et al. |
| 2003/0004882 A1 | 1/2003 | Holler et al. |
| 2003/0005096 A1 | 1/2003 | Paul et al. |
| 2003/0009538 A1 | 1/2003 | Shah et al. |
| 2003/0014470 A1 | 1/2003 | Iijima |
| 2003/0031164 A1 | 2/2003 | Nabkel et al. |
| 2003/0033379 A1 | 2/2003 | Civanlar et al. |
| 2003/0036882 A1 | 2/2003 | Harper et al. |
| 2003/0037328 A1 | 2/2003 | Cicciarelli et al. |
| 2003/0041136 A1 | 2/2003 | Cheline et al. |
| 2003/0046371 A1 | 3/2003 | Falkner |
| 2003/0051128 A1 | 3/2003 | Rodriguez et al. |
| 2003/0055878 A1 | 3/2003 | Fletcher et al. |
| 2003/0061067 A1 | 3/2003 | Atwal et al. |
| 2003/0078960 A1 | 4/2003 | Murren et al. |
| 2003/0110188 A1 | 6/2003 | Howard et al. |
| 2003/0120502 A1 | 6/2003 | Robb et al. |
| 2003/0126242 A1 | 7/2003 | Chang |
| 2003/0140160 A1 | 7/2003 | Raz et al. |
| 2003/0177381 A1 | 9/2003 | Ofek et al. |
| 2003/0191730 A1 | 10/2003 | Adkins et al. |
| 2003/0204562 A1 | 10/2003 | Hwang |
| 2003/0233383 A1 | 12/2003 | Kosimies |
| 2003/0233493 A1 | 12/2003 | Boldon et al. |
| 2004/0010716 A1 | 1/2004 | Childress et al. |
| 2004/0025018 A1 | 2/2004 | Haas et al. |
| 2004/0068554 A1 | 4/2004 | Bales et al. |
| 2004/0073787 A1 | 4/2004 | Ban et al. |
| 2004/0093492 A1 | 5/2004 | Daude et al. |
| 2004/0098426 A1 | 5/2004 | Ishii et al. |
| 2004/0104927 A1 | 6/2004 | Husain et al. |
| 2004/0107273 A1 | 6/2004 | Biran et al. |
| 2004/0123153 A1 | 6/2004 | Wright et al. |
| 2004/0128346 A1 | 7/2004 | Melamed et al. |
| 2004/0148306 A1 | 7/2004 | Moulton et al. |
| 2004/0180721 A1 | 9/2004 | Rowe |
| 2004/0193876 A1 | 9/2004 | Donley et al. |
| 2004/0201604 A1 | 10/2004 | Kraenzel et al. |
| 2004/0236843 A1 | 11/2004 | Wing et al. |
| 2004/0243650 A1 | 12/2004 | McCrory et al. |
| 2004/0243928 A1 | 12/2004 | Hesmer et al. |
| 2004/0267944 A1 | 12/2004 | Britt, Jr. |
| 2005/0027846 A1 | 2/2005 | Wolfe et al. |
| 2005/0033757 A1 | 2/2005 | Greenblatt et al. |
| 2005/0033808 A1 | 2/2005 | Cheng et al. |
| 2005/0044197 A1 | 2/2005 | Lai |
| 2005/0044332 A1 | 2/2005 | de Brebisson |
| 2005/0044544 A1 | 2/2005 | Slivka et al. |
| 2005/0060281 A1 | 3/2005 | Bucher et al. |
| 2005/0071267 A1 | 3/2005 | Takahashi et al. |
| 2005/0096920 A1 | 5/2005 | Matz et al. |
| 2005/0108297 A1 | 5/2005 | Rollin et al. |
| 2005/0108546 A1 | 5/2005 | Lehew et al. |
| 2005/0108593 A1 | 5/2005 | Purshothaman et al. |
| 2005/0144218 A1 | 6/2005 | Heintz |
| 2005/0149729 A1 | 7/2005 | Zimmer et al. |
| 2005/0160289 A1 | 7/2005 | Shay |
| 2005/0188315 A1 | 8/2005 | Campbell et al. |
| 2005/0192035 A1 | 9/2005 | Jiang |
| 2005/0193245 A1 | 9/2005 | Hayden et al. |
| 2005/0198196 A1 | 9/2005 | Bohn et al. |
| 2005/0198239 A1 | 9/2005 | Hughes |
| 2005/0216524 A1 | 9/2005 | Gomes et al. |
| 2005/0216902 A1 | 9/2005 | Schaefer |
| 2005/0226059 A1 | 10/2005 | Kavuri et al. |
| 2005/0256952 A1 | 11/2005 | Mouhanna et al. |
| 2005/0262503 A1 | 11/2005 | Kane |
| 2005/0268145 A1 | 12/2005 | Hufferd et al. |
| 2005/0273486 A1 | 12/2005 | Keith, Jr. |
| 2005/0283606 A1 | 12/2005 | Williams |
| 2005/0286435 A1 | 12/2005 | Ogawa et al. |
| 2006/0021040 A1 | 1/2006 | Boulanger et al. |
| 2006/0031377 A1 | 2/2006 | Ng et al. |
| 2006/0031407 A1 | 2/2006 | Dispensa et al. |
| 2006/0031529 A1 | 2/2006 | Keith, Jr. |
| 2006/0035713 A1 | 2/2006 | Cockerille et al. |
| 2006/0041641 A1 | 2/2006 | Breiter et al. |
| 2006/0041759 A1 | 2/2006 | Kaliski, Jr. et al. |
| 2006/0047716 A1 | 3/2006 | Keith, Jr. |
| 2006/0047946 A1 | 3/2006 | Keith, Jr. |
| 2006/0059384 A1 | 3/2006 | Helliker |
| 2006/0074943 A1 | 4/2006 | Nakano et al. |
| 2006/0095705 A1 | 5/2006 | Wichelman et al. |
| 2006/0106842 A1 | 5/2006 | Diament et al. |
| 2006/0106896 A1 | 5/2006 | Carlson et al. |
| 2006/0129459 A1 | 6/2006 | Mendelsohn |
| 2006/0143709 A1 | 6/2006 | Brooks et al. |
| 2006/0149955 A1 | 7/2006 | Velhal et al. |
| 2006/0179061 A1 | 8/2006 | D'Souza et al. |
| 2006/0184587 A1* | 8/2006 | Federwisch et al. ......... 707/200 |
| 2006/0224544 A1 | 10/2006 | Keith, Jr. |
| 2006/0224545 A1 | 10/2006 | Keith, Jr. |
| 2006/0224636 A1* | 10/2006 | Kathuria et al. .............. 707/200 |
| 2006/0233310 A1 | 10/2006 | Adams, Jr. et al. |
| 2007/0011292 A1 | 1/2007 | Fristch et al. |
| 2007/0078982 A1 | 4/2007 | Aidun et al. |
| 2007/0094269 A1 | 4/2007 | Mikesell et al. |
| 2007/0143374 A1 | 6/2007 | D'Souza et al. |
| 2007/0174658 A1 | 7/2007 | Takamoto et al. |
| 2007/0174690 A1 | 7/2007 | Kambara et al. |
| 2007/0185936 A1 | 8/2007 | Derk et al. |
| 2007/0233633 A1 | 10/2007 | Keith, Jr. |
| 2007/0239905 A1 | 10/2007 | Banerjee et al. |
| 2007/0255604 A1 | 11/2007 | Seelig |
| 2007/0271290 A1 | 11/2007 | Keith, Jr. |
| 2007/0271428 A1 | 11/2007 | Atluri |
| 2007/0274315 A1 | 11/2007 | Keith, Jr. |
| 2007/0276836 A1 | 11/2007 | Chatterjee et al. |
| 2008/0016387 A1 | 1/2008 | Bensinger |
| 2008/0034019 A1 | 2/2008 | Cisler et al. |
| 2008/0034071 A1 | 2/2008 | Wilkinson et al. |
| 2008/0072002 A1 | 3/2008 | Kuwahara et al. |
| 2008/0077622 A1 | 3/2008 | Keith, Jr. |
| 2008/0077630 A1 | 3/2008 | Keith, Jr. |
| 2008/0090560 A1 | 4/2008 | Bouzid et al. |
| 2008/0127294 A1 | 5/2008 | Keith, Jr. |
| 2008/0209142 A1 | 8/2008 | Obernuefemann |
| 2008/0216168 A1 | 9/2008 | Larson et al. |
| 2008/0294860 A1 | 11/2008 | Stakutis et al. |
| 2008/0313632 A1 | 12/2008 | Kumar et al. |
| 2009/0075593 A1 | 3/2009 | Demirbasa et al. |
| 2009/0094362 A1 | 4/2009 | Huff |
| 2010/0050011 A1 | 2/2010 | Takamoto et al. |
| 2010/0125770 A1 | 5/2010 | Keith, Jr. |
| 2011/0047118 A1 | 2/2011 | Keith, Jr. |
| 2011/0161729 A1 | 6/2011 | Ritz et al. |
| 2012/0084364 A1 | 4/2012 | Sivavakeesar |
| 2012/0198154 A1 | 8/2012 | Keith, Jr. |
| 2012/0272099 A1 | 10/2012 | Keith, Jr. |
| 2013/0031405 A1 | 1/2013 | Keith, Jr. |

(56) References Cited

U.S. PATENT DOCUMENTS

FOREIGN PATENT DOCUMENTS

| WO | 2005119495 | A2 | 12/2005 |
|----|------------|----|---------|
| WO | 2006010131 | A2 | 1/2006  |
| WO | 2006094282 | A2 | 9/2006  |
| WO | 2006094301 | A2 | 9/2006  |
| WO | 2007139962 | A2 | 12/2007 |
| WO | 2007139963 | A2 | 12/2007 |
| WO | 2008039386 | A2 | 4/2008  |
| WO | 2008039394 | A2 | 4/2008  |
| WO | 2008039395 | A2 | 4/2008  |

OTHER PUBLICATIONS http://www.swapdrive.com/sdbackup.asp.
http://www.backup.com.
VMware, Using VMware Infrastructure for Backup and Restore, Oct. 26, 2006, http://www.vmware.com/resource/techresources/ , pp. 1-20.
VMware, WMware Infrastructure Architecture Overview, Jun. 14, 2006, http://www.vmware.com/resource/techresources/ , pp. 1-14.
IEEE100 The Authoritative Dictionary of IEEE Standards Terms, Seventh Edition, Jan. 2003. 3 pages.
Microsoft@ Computer Dictionary, Fifth Edition, 2002, 3 pages.
MacDonald, J.P., "File System Support for Delta Compression," University of California at Berkeley, Dept. of Electrical Engineering and Computer Sciences, May 19, 2000, 32 pages.
Tidgell, A., "Efficient Algorithms for Sorting and Synchronization," Thesis, The Australian National University, Feb. 1999, 106 pages.
Random House Unabridged Dictionary, "device: meaning and definitions," 1997, RandomHouse Inc., retrieved via "http://dictionary.infoplease.com/device."
http://en.wikipedia.org/wik/Expert system, pp. 1-9.
http://.pctools.com/registry-mechanic/. pp. 1-2.
http://www.stealthbits.com/, pp. 1-2.
http://macrovision.com/products/flexnet_installshield/installshield/index.shtml, pp. 1-2.
http://macrovision.com/products/flexnet_installshield/installshield/overview/index.shtml, pp. 1-3.
http://www.microsoft.com/technet/prodtechnol/windows2000serv/maintain/featsability/inmnwp.mspx, pp. 1-36.
Muthitacharoen et al., "A Low-Bandwidth Network File System," MIT Laboratory for Computer Science and NYU Department of Computer Science, 2001, 14 pages.
Shepler et al. "RFC 3530—Network File System (NFS) Version 4 Protocol"/ Standards Track, Apr. 2003, pp. 278, http://tools.ietf.org/html/rfc3530#page-119.
Cisco PIX "Configuring an IPSec Tunnel Between a Cisco Secure PIX Firewall and a Checkpoint NG Firewall." May 12, 2006, document ID 23785.
Yu et al., "Scalable network resource management for large scale Virtual Private Networks," Stimulation Modeling Practice and Theory, 12(2004) pp. 263-285.
Bandwidth Capping Source http://www.24onlinebilling.comdownload/whitepapers/Bandwidth%20Capping%20At%20Source.pdf pp. 1-9.
Microsoft Press, Microsoft Computer Dictionary, Fifth Edition, May 1, 2002, p. 39.
Definition of Plug-in (computing) from http://en.wikipedia.org.wiki.Plug-in_(computing), printed on Jun. 8, 2011, 1 page.
Plug-in definition from Wikipedia, http://en.wikipedia.org/wiki/Plug-in_(computing), printed Nov. 6, 2011, 5 pages.
Definition of background processing, IEEE 100, The Authorative Dictionary of IEEE Standards Terms, 7th Edition, 2000, 3 pages.

\* cited by examiner

WARM STANDBY APPLIANCE

RELATED APPLICATION(S)

The present application is a continuation of co-pending U.S. patent application Ser. No. 12/940,526, filed Nov. 5, 2010, and entitled "WARM STANDBY APPLIANCE," which is a continuation of U.S. patent application Ser. No. 11/644,581, filed Dec. 21, 2006, and entitled "WARM STANDBY APPLIANCE," now issued as U.S. Pat. No. 7,844,686, which are both hereby incorporated by reference.

FIELD OF THE INVENTION

The present invention relates to the field of computing. More specifically, the present invention relates to the field of implementing a warm standby appliance.

BACKGROUND OF THE INVENTION

A typical network requires the use of one or more servers to store, distribute and process data. Furthermore, the network typically implements a backup system to save data in the event a server loses data whether it be due to a virus, software issue or hardware failure. Although the data is backed up, that does not remedy the problem of the server being inaccessible as a result of a malfunction. Once a server fails, an administrator has to replace the server with another server which is a process that could take a few hours or days if a new server needs to be purchased. With a server down, data stored on that server is likely inaccessible which causes problems such as a website being unavailable. It has been estimated that millions of dollars are lost due to system inaccessibility. Furthermore, there is a significant effect on reputation when a company's website is down. Moreover, for Local Area Networks (LANs) within an organization, a server being down would halt productivity if employees are unable to access their data.

A solution of ensuring that the server information is continuously available is to utilize a dedicated backup server for each server. While that works well with one server, it becomes a high cost solution with multiple servers as each server typically costs many thousands of dollars.

Another common feature when utilizing networks is Lights Out Management (LOM) which allows a system administrator to monitor and manage servers remotely. A typical LOM system includes a hardware component called a LOM module and an application for monitoring system variables such as temperature and CPU utilization. The application also provides the system administrator with remote abilities such as rebooting, fan speed control, troubleshooting and operating system installation. Although LOM provides some remote management abilities, there are many issues that LOM is unable to handle.

SUMMARY OF THE INVENTION

A warm standby appliance is described herein. The warm standby appliance is coupled to a storage server which is coupled to one or more servers. When a server fails, the storage server transfers a backed up image to the warm standby appliance, so that the warm standby appliance is able to replicate the failed server. While the failed server is inaccessible, the warm standby appliance is able to mimic the functionality of the failed server. When a new server or repaired server is available, the warm standby appliance is no longer needed. To incorporate the new server into the system quickly and easily, the server image of the warm standby appliance is sent to the new server. After transferring the image, the warm standby appliance is cleaned and returns back to a dormant state, waiting to be utilized again.

In one aspect, a system for providing network stability and data reliability comprises a first server, a second server coupled to the first server wherein the second server stores data received from the first server and a computing device coupled to the second server device, wherein the computing device performs functions of the first server when the first server fails. The second server is a storage server. The first server backs up the data onto the second server using a continous backup scheme. The second server stores a system image of the first server. The second server transfers the system image to the computing device when the first server fails. The computing device transfers the system image to a replacement server for the first server. The computing device clears the system image from the computing device. The computing device mimics the first server. The first server is accessible by customers. The computing device is running and available to receive the data from the second server before the first server fails. The computing device is remotely accessible. The second server generates a virtual server to perform functions of the first server if the computing device is unavailable.

In another aspect, a method of providing network stability and data reliability comprises backing up data from a first server to a second server, transferring the data from the second server to a computing device when the first server fails and serving the data utilizing the computing device until the first server is replaced. The method further comprises replacing the failed server. The second server is a storage server. The first server backs up the data onto the second server using a continous backup scheme. The method further comprises storing a system image of the first server on the second server. The method further comprises transferring the system image from the second server to the computing device when the first server fails, wherein the system image corresponds to the failed first server. The method further comprises transferring the system image from the computing device to a replacement server for the failed first server. The method further comprises clearing the system image from the computing device. Serving the data utilizing the computing device includes mimicking the failed first server before the server failed. The first server is accessible by customers. The computing device is running and available to receive the data from the second server before the first server fails. The computing device is remotely accessible. The method further comprises generating a virtual server with the second server to perform functions of the first server if the computing device is unavailable. The first server is one of a set of first servers.

In yet another aspect, a network of devices for providing network stability and data reliability comprises a set of first servers, a second server coupled to the set of first servers, wherein the second server stores data received from the set of first servers, a third server coupled to the second server, wherein the third server performs functions of a server of the set of first servers when the server fails if the third server is available, and if the third server is unavailable, the second server generates a virtual server for the failed server in the set of first servers and further wherein the virtual server performs functions of the failed server, a regional data center coupled to the second server for backing up the data regionally and a remote data center coupled to the regional data center for backing up the data remotely. The second server is a storage server. The set of first servers back up the data onto the second server using a continous backup scheme. The second server stores a system image of each server of the set of first servers. The second server transfers the system image to the third server when the server of the first servers fails, wherein the system image corresponds to the failed server of the set of first servers. The third server transfers the system image to a replacement server for the failed server. The third server clears the system image from the third server. The third server mimics the failed server of the set of first servers before the server failed. The second server transfers the system image to the virtual server when generating the virtual server, wherein the system image corresponds to the failed server of the set of first servers. The virtual server transfers the system image to a replacement server for the failed server of the set of first servers. The virtual server mimics the failed server of the set of first servers before the server failed. The virtual server is generated in real-time. The second server continues to back up the data while running the virtual server. The set of first servers are accessible by customers. The third server is running and available to receive the data from the second server before the server of the set of first servers fails. The third server is remotely accessible.

In yet another aspect, an apparatus for providing network stability and data reliability comprises a storage component, a data backup application stored on the storage component for backing up data received from a server and a data restore application stored on the storage component for restoring the data received from the server. The data received comprises a server image. The apparatus is remotely accessible. The data is cleared from the storage component after the server is replaced.

DETAILED DESCRIPTION OF THE PREFERRED EMBODIMENT:

A warm standby appliance is described herein. A server configuration includes one or more servers in addition to a storage server or a backup server. The warm standby appliance is coupled to the storage server. Using a continous backup scheme, the one or more servers continuously back up their data on the storage server. The storage server stores all of the relevant application and user data corresponding to each server. The storage server also stores and is aware of the environment on each server. For instance, if one of the servers is a SQL server, the storage server contains the necessary software and/or image to replicate the SQL server. The warm standby appliance contains an operating system and utilities to back up and restore data when needed. Specifically, when one of the servers fails, the warm standby appliance is available to take the place of the failed server by quickly receiving the failed server's image from the storage server. The warm standby appliance becomes a temporary replacement server in real-time (e.g. instantaneously aside from set up time) so that the change is seamless. As described, the storage server is aware of each server's environment, and thus is able to provide the warm standby appliance with the same environment as the faulty server. While the failed server is inaccessible, the warm standby appliance is able to mimic the actions and data contained on the failed server. Thus, when users attempt to access an application or data that is on the failed server, they will continue to access the information uninterrupted as if the failed server were up and running The warm standby appliance is able to run for up to many days. Then, when a new server or repaired server is available, the warm standby appliance is no longer used as the server. To incorporate the new server into the system quickly and easily, the server image of the warm standby appliance is sent to the new server. After transferring the image, the warm standby appliance is cleared and returns back to a dormant state, waiting to be utilized again.

In the event that more servers fail than there are warm standby appliances available, the storage server is able to generate a virtual recovery server corresponding to each additional failed server as described in U.S. patent application Ser. No. 11/644,451, filed on Dec. 21, 2006 and entitled Virtual Recovery Server, herein incorporated by reference. Therefore, in addition to multiple standby appliances being available, multiple virtual recovery servers are able to be generated if needed.

Figure 1A:
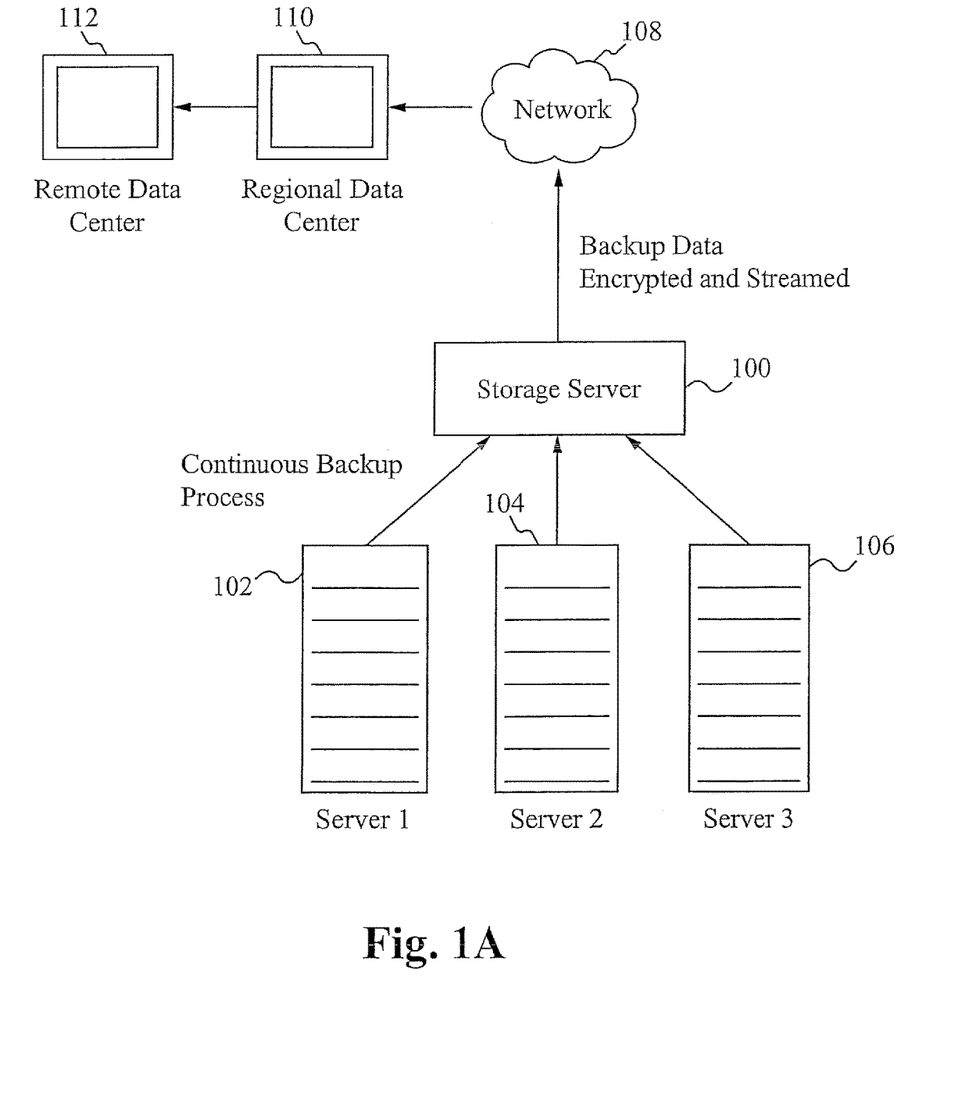
FIG. 1A illustrates a graphical representation of a server configuration.

FIG. 1A illustrates a graphical representation of a server configuration. A storage server 100 backs up data from servers 102, 104, 106. The servers 102, 104, 106 continously back up data to the storage server 100. In some embodiments, the backup is performed by taking snapshots or images of each of the servers 102, 104, 106 on a periodic basis, such as, every hour and transmitting the snapshots to the storage server 100. In other embodiments, the snapshots are taken more or less often depending on how critical the data is. Furthermore, the data is able to be backed up by means other than snapshots. The storage server 100 is any storage implementation such as a server with dedicated storage or a set of Redundant Array of Inexpensive Disks (RAIDs). In embodiments where it is crucial to ensure that the backed up data is even more secure, the data is sent via a network 108 to a regional data center 110 and a remote data center 112. The regional data center 110 backs up the data in a location relatively near the servers 102, 104, 106, while the remote data center 112 is remotely stored to back up the data in case of an earthquake or other disaster that destroys data in one area but not in a remote area.

Figure 1B:
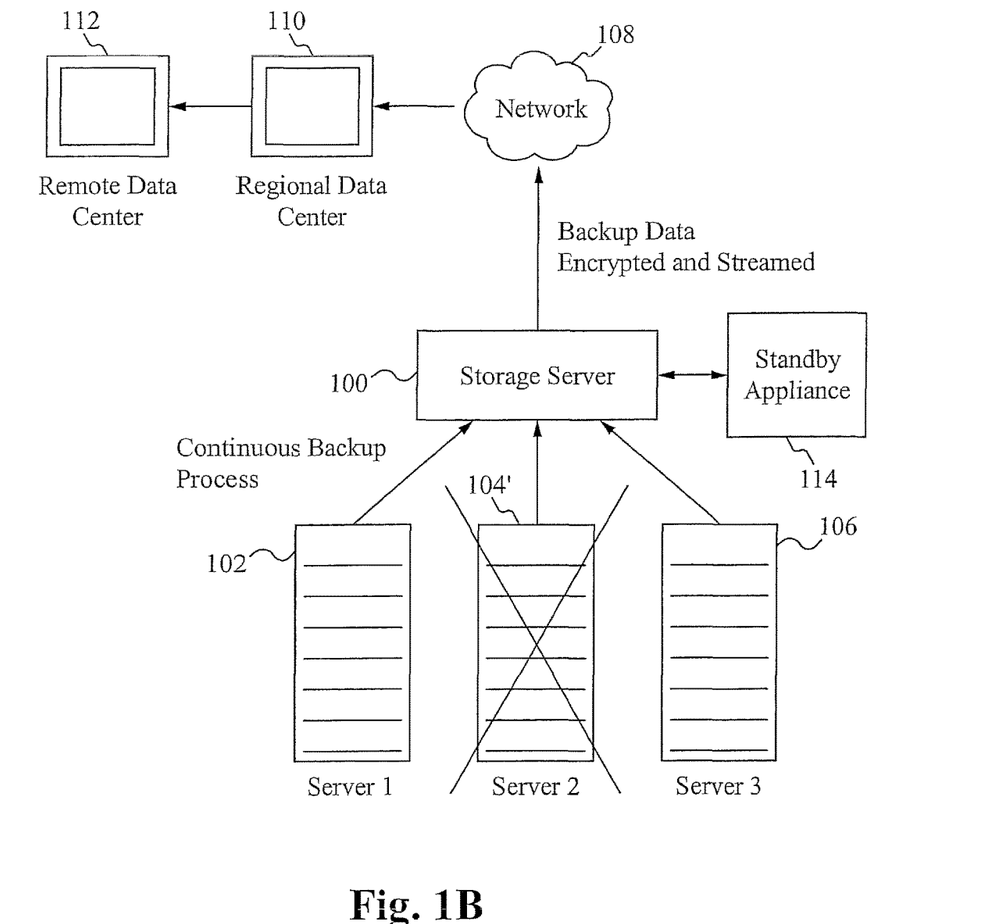
FIG. 1B illustrates a graphical representation of an embodiment of the present invention.

FIG. 1B illustrates a graphical representation of an embodiment of the present invention. As shown, the server 104' has failed and is inaccessible. A warm standby appliance 114 is coupled to the storage server 100 to temporarily replace the failed server 104'. The warm standby appliance is able to be any computing device with adequate features, but is preferably a server device with sufficient storage and computing capacity to mimic another server. The warm standby appliance 114 mimics the faulty server 104' by taking the configuration information and other data from the storage server 100 and restoring the server on the warm standby appliance hardware using that information. By restoring a server on the warm standby appliance 114 which appears to be the same entity as the faulty server 104', users who attempt to access data or applications on the faulty server 104' will not experience any issues. The warm standby appliance 114 acts the same as the faulty server 104' before it failed. In embodiments where it is crucial to ensure that the backed up data is secured not only once, but multiple times, the data is sent via a network 108 to a regional data center 110 and a remote data center 112.

Figure 2:
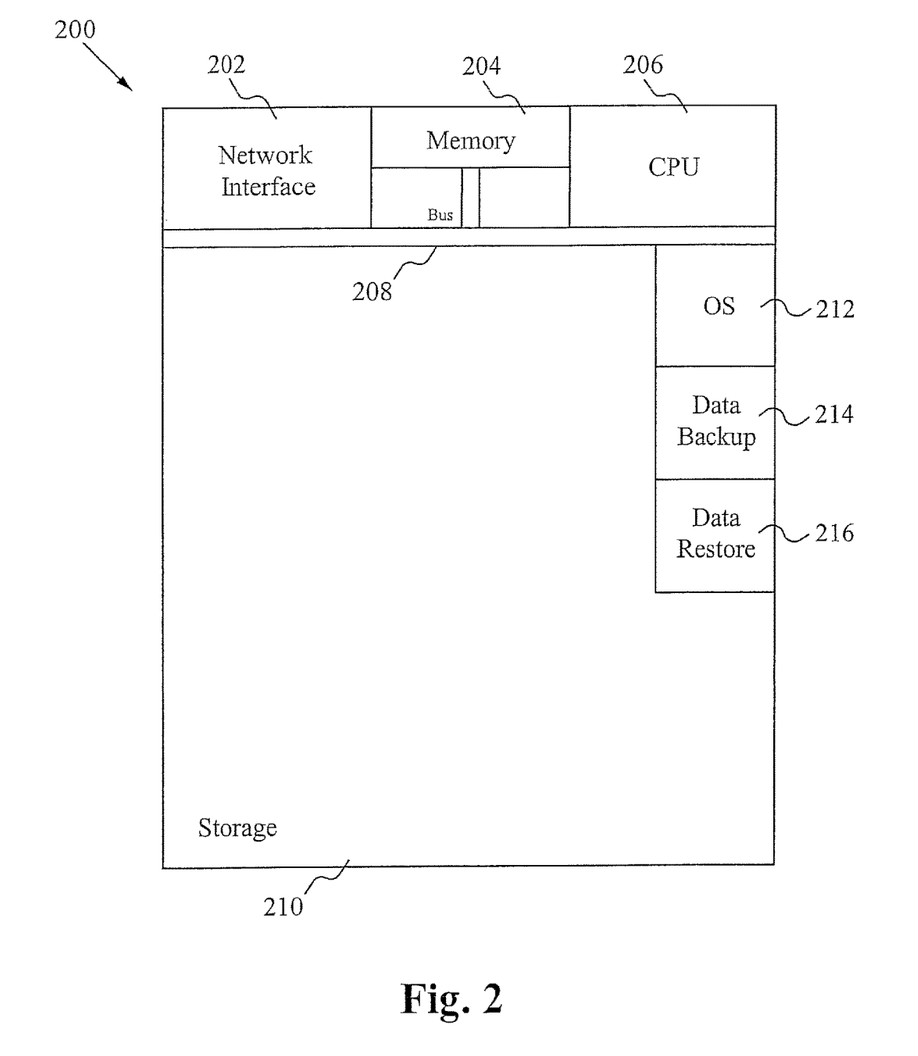
FIG. 2 illustrates a block diagram of a warm standby appliance of the present invention.

FIG. 2 illustrates a block diagram of a warm standby appliance of the present invention. A warm standby appliance 200 contains standard server components including a network interface 202, a memory 204, a central processing unit 206, a system bus 208 and storage 210 in addition to other standard computing components. Furthermore, the warm standby appliance 200 is able to have multiple of each of these components, for example many servers have more than one central processing unit 206. The storage 210 is able to be any storage implementation such as a hard disk drive, RAID, or another form of storage. Contained within the storage is an operating system 212 and applications for data backup 214 and data restore 216 amongst other utilities for tasks such as partitioning.

Figure 3:
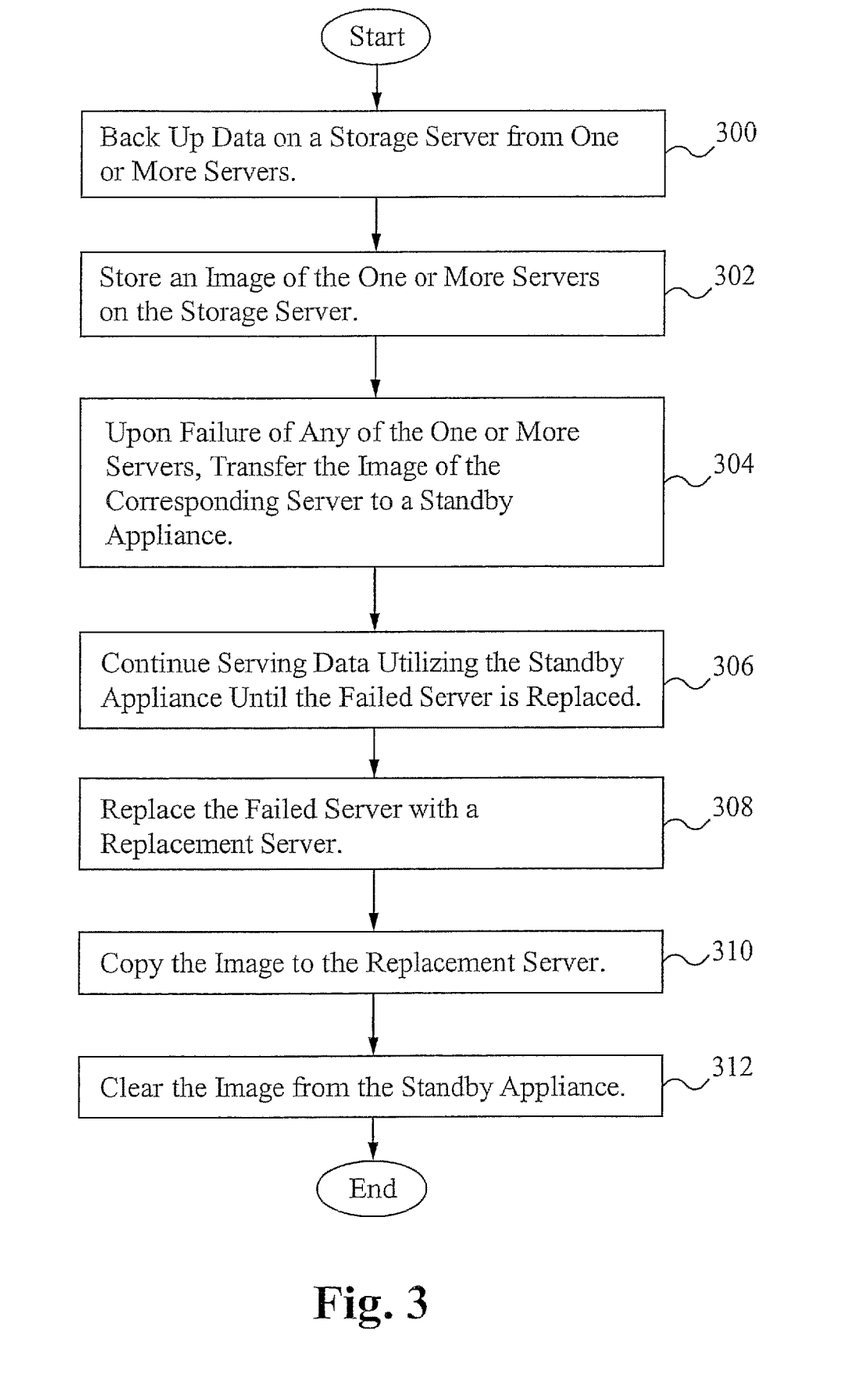
FIG. 3 illustrates a flow chart of an embodiment of the present invention.

FIG. 3 illustrates a flow chart of an embodiment of the present invention. In the step 300, data is backed up on a storage server from the one or more servers. In the step 302, an image of each of the one or more servers is stored on the storage server. In some embodiments, the steps 300 and 302 are combined. Upon failure of any of the one or more servers, the image of the corresponding failed server is transferred to a warm standby appliance, in the step 304. The warm standby appliance is able to mimic the failed server using the image along with applications that have the ability to restore and run the server. In the step 306, the warm standby appliance continues serving data until the failed server is replaced. In the step 308, the failed server is replaced, and in the step 310, the image on the warm standby appliance is copied to the replacement server for another smooth transition. The warm standby appliance is then cleared, in the step 312, so that it is able to mimic another failed server at a later time. In some embodiments, the process automatically occurs; whereas, in other embodiments an administrator initiates and maintains the process.

Figure 4:
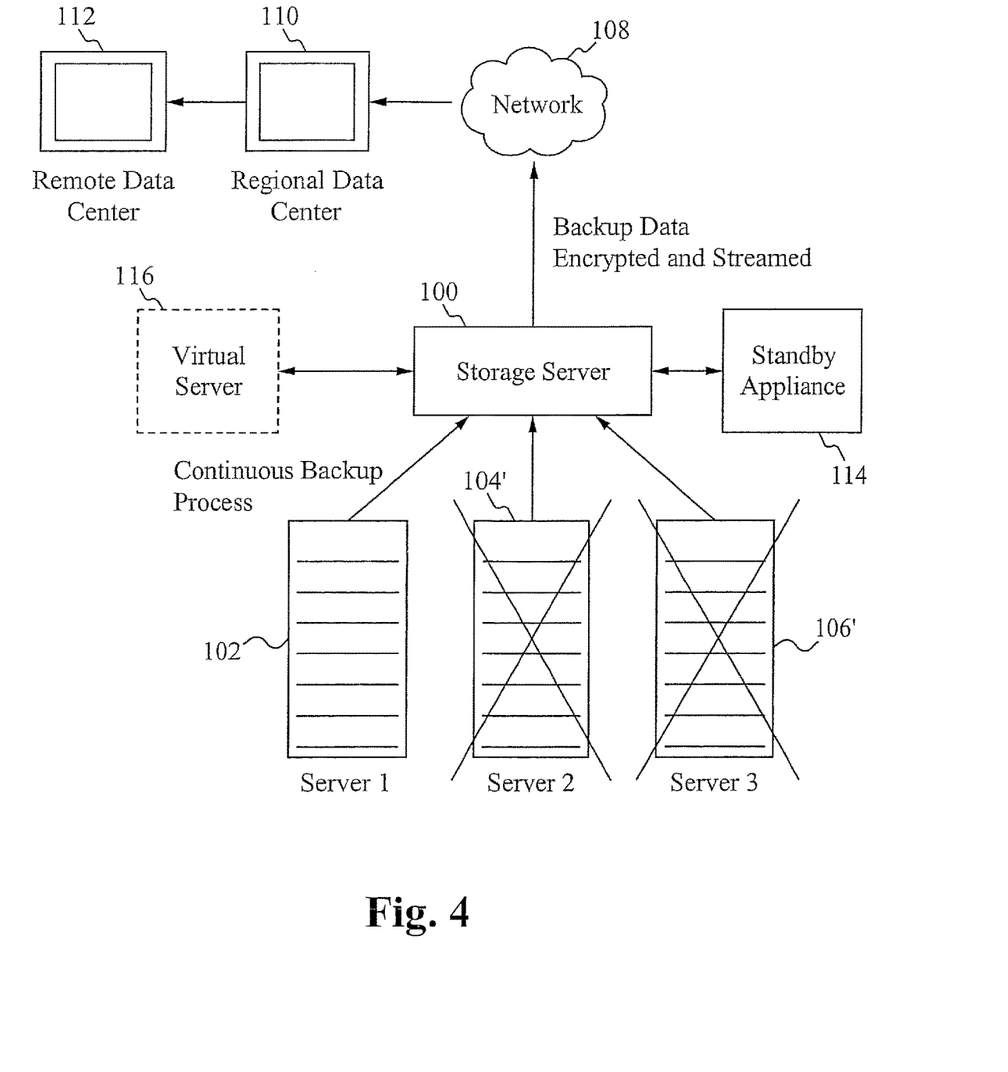
FIG. 4 illustrates a graphical representation of an embodiment of the present invention.

FIG. 4 illustrates a graphical representation of an embodiment of the present invention. As described previously, a storage server 100 is coupled to one or more servers 102, 104, 106 (FIG. 1A). The storage server 100 couples to a regional data center 110 and a remote data center 112 through a network 108. The storage server 100 is also coupled to a warm standby appliance 114. The warm standby appliance 114 is available when one of the servers 102, 104, 106 fails, as is shown in the example, assuming Server 2 104' failed first. When one warm standby appliance is utilized, then any failed servers beyond one would not be protected using the warm standby appliance 114. Therefore, a virtual server 116 is able to be generated from the storage server 100. For example, if Server 3 106' fails after Server 2 104' failed. Server 2 104' is being mimicked by the warm standby appliance 114 when Server 3 106' fails. Since the warm standby appliance 114 is preoccupied/unavailable, the storage server 100 generates a virtual server 116 to represent Server 3 106'. The virtual server 116 is generated using the image of the failed server, specifically Server 3 106'. Thus using the combination of the warm standby appliance 114 and the virtual server 116, even with multiple server failures, the network is able to continue functioning as if there were no issues from the user's perspective. Although only one warm standby appliance and only one virtual server are described above, any number of warm standby appliances and virtual servers are able to be implemented. For example, for a large company with fifty servers where the absolute minimum downtime is required, the company may have two warm standby appliances and the ability to generate multiple virtual servers in case many servers fail at roughly the same time.

Figure 5:
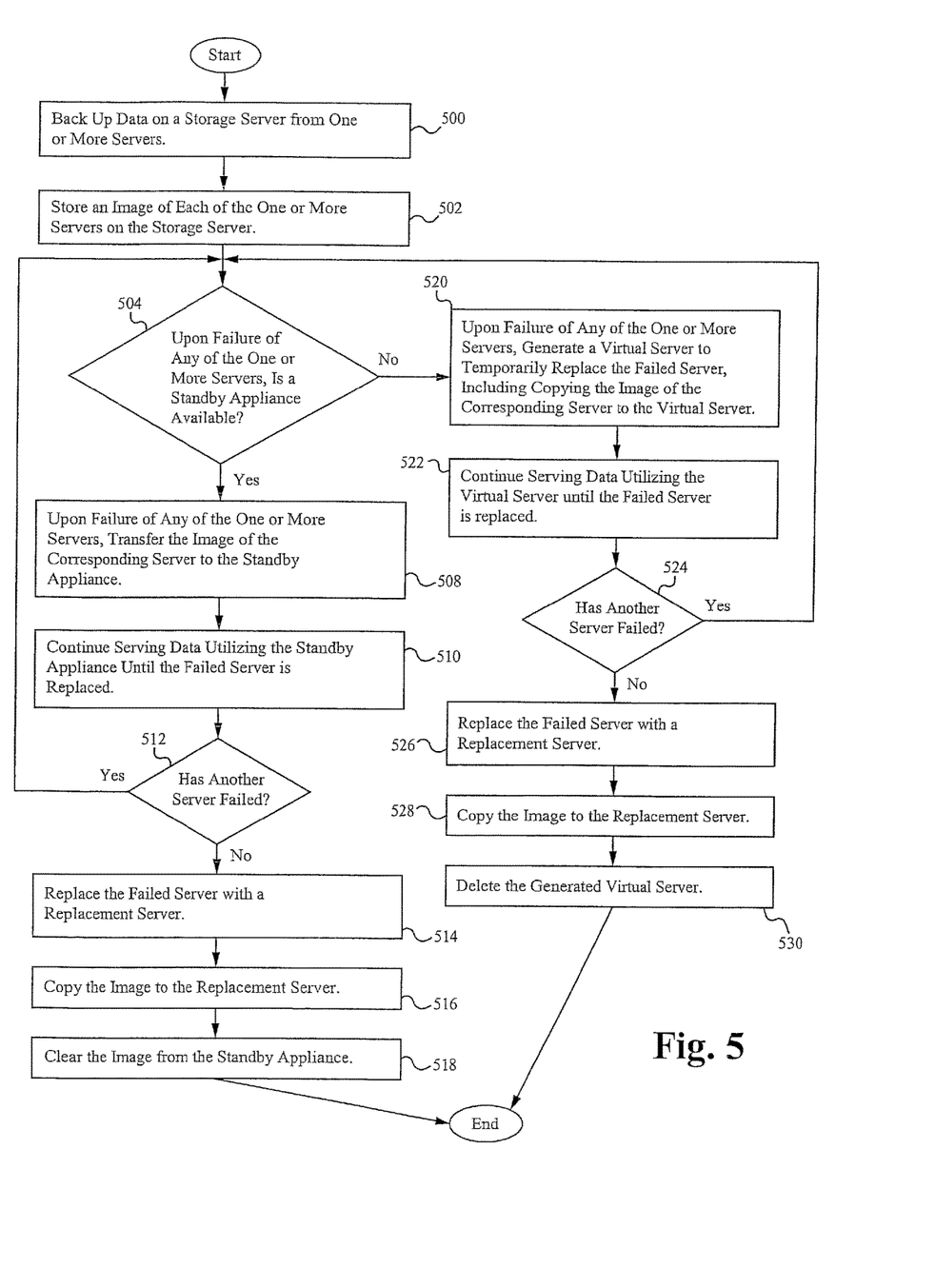
FIG. 5 illustrates a flow chart of an embodiment of the present invention.

FIG. 5 illustrates a flow chart of an embodiment of the present invention. In the step 500, data is backed up on a storage server from the one or more servers. In the step 502, an image of each of the one or more servers is stored on the storage server. Upon failure of any of the one or more servers, it is determined if a warm standby appliance is available in the step 504. If it is determined that a warm standby appliance is available in the step 504, then the image of the corresponding server is transferred to the warm standby appliance in the step 508. The warm standby appliance is able to mimic the failed server using the image along with applications that have the ability to restore and run the server. In the step 510, the warm standby appliance continues serving data until the failed server is replaced. In the step 512, it is determined if another server has failed. If another server has failed, then the process returns to the step 506. If another server has not failed since the previous server failed, then in the step 514, the failed server is replaced with a replacement server. In the step 516, the image on the warm standby appliance is copied to the replacement server for another smooth transition. The warm standby appliance is then cleared, in the step 518, so that it is able to mimic another failed server later on.

If in the step 506, a warm standby appliance is not available, a virtual server is temporarily generated to replace the failed server in the step 520. Generating the virtual server includes copying the image of the corresponding server to the virtual server. In the step 522, the generated virtual server continues serving data until the failed server is replaced. In the step 524, it is determined if another server has failed. If another server has failed, then the process returns to the step 506 to determine if a standby appliance is available. It is possible that the failed server that the warm standby appliance was temporarily replacing was a failed server which has been replaced, thus freeing the warm standby appliance. If another server has not failed in the step 524, before the failed server is replaced with a replacement server in the step 526, then the process continues when ready. In the step 528, the image on the virtual server is copied to the replacement server to transition the replacement server as the utilized server. The generated virtual server is then deleted, in the step 530. The system is continuously backing up data in addition to monitoring for server failures. Therefore, when a server does fail, the system is able to adapt and utilize the necessary resources whether they be one or more warm standby appliances and/or one or more virtual servers. In some embodiments, the process automatically occurs; whereas, in other embodiments an administrator maintains the process.

The present invention is utilized by coupling a warm standby appliance to a storage or backup server wherein the storage server then transfers a server image to the warm standby appliance when the corresponding server fails. The storage server continously captures images of the servers, so that minimal data is lost if a server were to fail. The warm standby appliance is then able to mimic the failed server while the failed server is being repaired or replaced. Thus, from a customer or user perspective, there will be little downtime affecting the user's interaction with the server. In embodiments where the storage server contains necessary applications to generate one or more virtual servers for situations where the warm standby appliance is already in use for a previously failed server, the virtual servers are usable. After the failed server is replaced and the proper server image is copied to the replacement server, the warm standby appliance is cleared, so that it is able to be used for the next failed server. Virtual servers are deleted after they are no longer necessary.

In operation, the present invention provides a temporary warm standby appliance when a server fails. One or more servers operate by serving information to users, where serving includes hosting a website, providing/storing data, executing applications or anything a server is capable of doing. Furthermore, each of these servers typically has a dedicated task or at least partitioned tasks, so that one server may be deemed an SQL server while another is focused on a different aspect of serving. A storage or backup server is utilized to back up these servers. The storage server utilizes any backup technology but preferably receives images of each server. When one or more of the servers fails, the storage server transfers the image of the failed server to the warm standby appliance. Therefore, the server is only down for a short amount of time while the warm standby appliance is setting up. Once the warm standby appliance is running, users should experience no difference than if the server were still running Once a replacement server arrives or the failed server is repaired, this replacement or repaired server is coupled to the network. Since there is no rush to install the new server, preferably the replacement is installed at a time when activity on the server is low and users are informed of a short period of downtime. The warm standby appliance transfers the image to the replacement, so that again, users experience no change in functionality and the replacement joins the network without causing problems. In addition to the warm standby appliance being available for failed servers, virtual servers are also able to be generated using the storage server, when needed.

The warm standby appliance also provides the ability of local or remote access and maintenance In addition to utilizing the warm standby appliance when a server has failed, the warm standby appliance is able to detect when a server is about to fail, so that the warm standby appliance starts taking over the serving processes before the server fails. With such a detection, it is possible to have zero downtime. A failing server is able to be detected in a number of ways such as by monitoring the system environment. For example, if the server's internal temperature is reaching a dangerously high temperature, that is an indicator that the server is about to shut down, and thus the warm standby appliance should take over. Other methods of detecting a failing server are possible.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for providing network stability and data reliability, comprising:
   a. one or more first servers;
   b. a second server coupled to the one or more first servers, wherein the second server stores data received from the one or more first servers; and
   c. one or more computing devices coupled to the second server,
   wherein the one or more computing devices perform functions of a number of the first servers that have failed upon receiving the data from the second server;
   wherein, when the number of failed first servers exceeds the number of computing devices, the second server generates at least one virtual server to perform functions of at least one failed first server whose functions are not being performed by the one or more computing devices.

2. The system as claimed in claim 1 wherein the second server is a storage server.

3. The system as claimed in claim 1 wherein the one or more first servers back up the data onto the second server using a continuous backup scheme.

4. The system as claimed in claim 1 wherein the second server stores system images of the one or more first servers.

5. The system as claimed in claim 4 wherein the second server transfers one or more of the system images to the one or more computing devices when the number of first servers fail.

6. The system as claimed in claim 5 wherein the one or more computing devices transfer the one or more of the system images to a replacement server for the number of first servers.

7. The system as claimed in claim 6 wherein the one or more computing devices clears the one or more of the system images from the one or more computing devices.

8. The system as claimed in claim 1 wherein the one or more computing devices mimic the one or more first servers.

9. The system as claimed in claim 1 wherein the one or more first servers are accessible by customers.

10. The system as claimed in claim 1 wherein the one or more computing devices are running and available to receive the data from the second server before the number of first servers fail.

11. The system as claimed in claim 1 wherein at least one of the one or more computing devices is remotely accessible.

12. The system as claimed in claim 1 wherein the second server generates a virtual server to perform functions of one of the number of first servers if the one or more computing devices are unavailable.

13. A method of providing network stability and data reliability, comprising:
   a. backing up data from one or more first servers to a second server;
   b. transferring the data from the second server to one or more computing devices when one or more of the first servers fail; and
   c. serving the data utilizing at least one of the one or more computing devices until the one or more first servers are replaced;
   wherein, when the number of failed first servers exceeds the number of computing devices, the second server generates at least one virtual server to perform functions of at least one failed first server whose functions are not being performed by the one or more computing devices.

14. The method as claimed in claim 13 further comprising replacing the failed first servers.

15. The method as claimed in claim 13 wherein the second server is a storage server.

16. The method as claimed in claim 13 wherein the one or more first servers back up the data onto the second server using a continuous backup scheme.

17. The method as claimed in claim 13 further comprising storing system images of the one or more first servers on the second server.

18. The method as claimed in claim 17 further comprising transferring the system images from the second server to one or more of the computing devices when a number of the first servers fail, wherein the system images correspond to the number of failed first servers.

19. The method as claimed in claim 18 further comprising transferring the system images from the one or more of the computing devices to one or more replacement servers for the number of failed first servers.

20. The method as claimed in claim 19 further comprising clearing the system images from the one or more of the computing devices.

21. The method as claimed in claim 13 wherein serving the data utilizing the one or more computing devices includes mimicking the number of failed first servers before the first servers failed.

22. The method as claimed in claim 13 wherein the first servers are accessible by customers.

23. The method as claimed in claim 13 wherein the computing devices are running and available to receive the data from the second server before the number of first servers fail.

24. The method as claimed in claim 13 wherein at least one of the computing devices is remotely accessible.

25. The method as claimed in claim 13 further comprising generating one or more virtual servers with the second server to perform functions of the number of first servers if the one or more computing devices are unavailable.

26. The method as claimed in claim 13 wherein the one or more first servers are a part of a set of first servers.

27. A method of providing network stability and data reliability, comprising:
   a. backing up data from one or more first servers to a second server;
   b. detecting when one or more of the first servers are going to fail;
   c. transferring the data from the second server to one or more computing devices when one or more of the first servers fail;
   d. serving the data utilizing one or more of the computing devices until the one or more failed first servers are replaced; and
   e. clearing the data from the one or more computing devices after the one or more failed first servers have been replaced;
   wherein, when a number of failed first servers exceeds a total number of the one or more computing devices, the second server generates at least one virtual server to perform functions of at least one failed first server whose functions are not being performed by the one or more computing devices.

28. The method of claim 27 wherein the data comprises applications that enable the functioning of the one or more first servers.

* * * * *